G. GOETZ.
DASH POT.
APPLICATION FILED JULY 16, 1906.
906,490.
Patented Dec. 8, 1908.
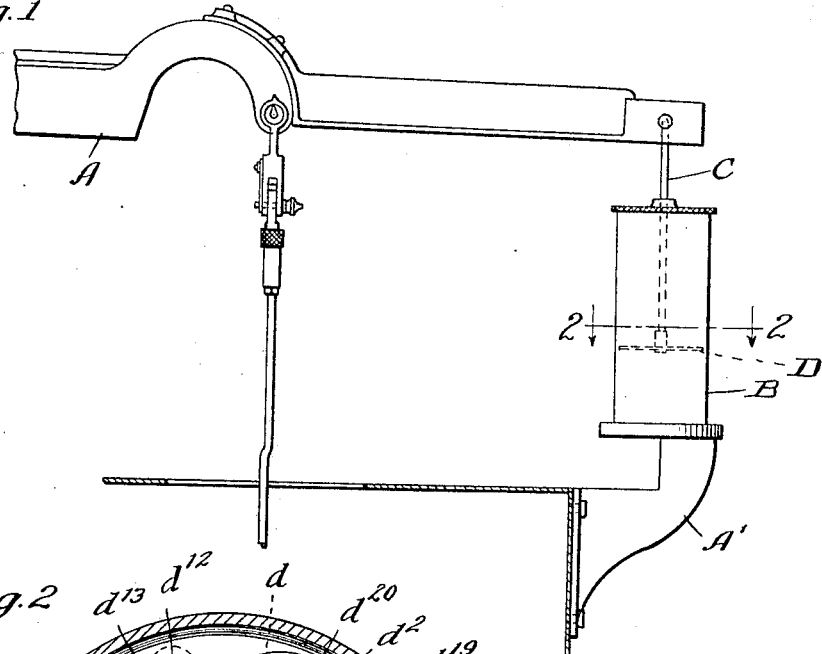
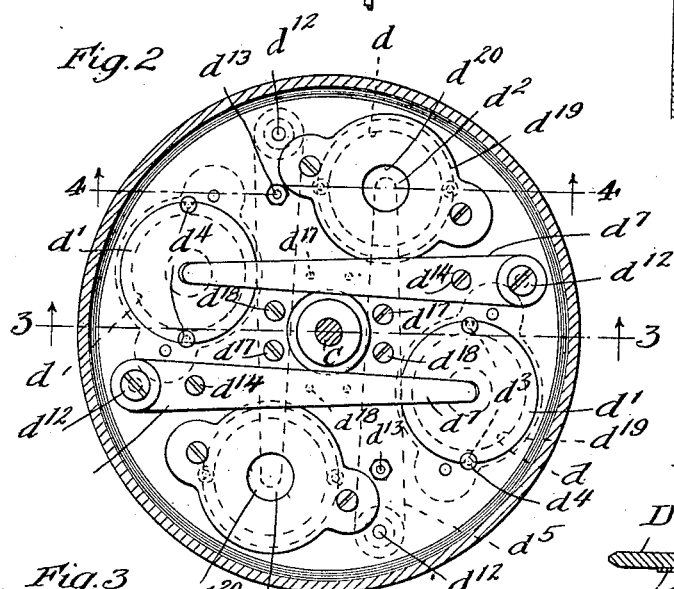
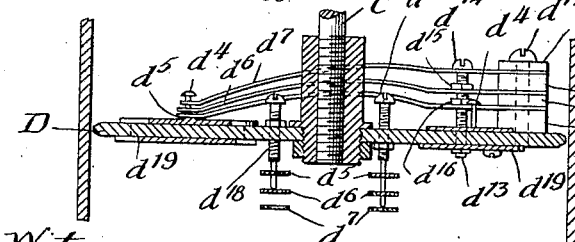
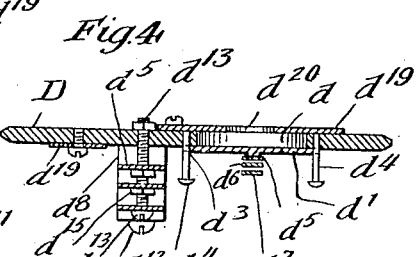
Witnesses:
Wm. Geiger
Inventor
George Goetz
By Munday, Evarts, Adcock & Clarke.
Attorneys

UNITED STATES PATENT OFFICE.

GEORGE GOETZ, OF CHICAGO, ILLINOIS, ASSIGNOR TO STREETER-AMET WEIGHING & RECORDING COMPANY, OF CHICAGO, ILLINOIS, A CORPORATION OF ILLINOIS.

DASH-POT.

No. 906,490.  Specification of Letters Patent.  Patented Dec. 8, 1908.

Original application filed May 12, 1905, Serial No. 260,117. Divided and this application filed July 16, 1906.

Serial No. 326,308.

*To all whom it may concern:*

Be it known that I, GEORGE GOETZ, a citizen of the United States, residing in Chicago, in the county of Cook and State of Illinois, have invented a new and useful Improvement in Dash-Pots, of which the following is a specification.

My invention relates to improvements in dash-pots for steadying and regulating the motion of devices connected thereto. And it is especially designed for use in connection with scales for automatically weighing railway cars and recording or printing the weights thereof while the cars are in motion for the purpose of steadying the movement of the scale beam and causing it to come very quickly to a true balance as is required in scales for weighing cars in motion. To accomplish this object or result, it is necessary that the dash-pot shall be so constructed as to permit a comparatively quick, rapid and free movement of the piston in the dash-pot cylinder while the scale beam is moving to a position approximating the balance position, while at the same time the dash-pot piston will be sensitive in steadying the movement of the scale beam as the latter reaches the position of a true balance.

My invention consists in the novel construction of parts and devices and in the novel combinations of parts and devices herein shown and described, by which this object or result is accomplished.

In the accompanying drawing forming a part of this specification, Figure 1 is a side elevation of a dash-pot embodying my invention as applied to a scale beam of a recording car scale. Fig. 2 is a horizontal section on line 2—2 of Fig. 1. Fig. 3 is a vertical section on line 3—3 of Fig. 2 and Fig. 4 is a detail section of the dash-pot on the broken line 4—4 of Fig. 2.

In the drawing, A represents the scale beam of a recording car scale to which my improved dash-pot may be applied for steadying and regulating the motion thereof, and $A^1$ is the frame bracket upon which the dash-pot cylinder B is mounted.

C is the piston stem by which the piston D of the dash-pot is connected to the scale beam A or other device, the motion of which is to be regulated and steadied by the dash-pot.

The piston D of the dash-pot cylinder B is provided with a plurality of ports or openings $d$ through the same, preferably four in number, which are normally closed by two upwardly opening valves $d^1$ and two downwardly opening valves $d^2$, each of said valves preferably consisting of a light, thin disk of metal having notches $d^3$ therein to engage the guide pins $d^4$ secured to the piston D. Each of the valves $d^1$ $d^2$ is normally held closed by three successively acting light, thin flexible and independently adjustable flat springs $d^5$ $d^6$ $d^7$ with which each of the valves is provided. The set of springs $d^5$ $d^6$ $d^7$ for each valve is secured to the piston D by means of suitable washers or blocks $d^8$ $d^9$ $d^{10}$ $d^{11}$ and screws $d^{12}$; and each of the three springs $d^5$ $d^6$ $d^7$ for each valve is independently adjustable, this being effected by the adjusting screw $d^{13}$ having a head $d^{14}$ bearing against the upper spring $d^7$, a nut $d^{15}$ bearing against the middle spring $d^6$ and a nut $d^{16}$ bearing against the lower spring $d^5$. The outer spring $d^7$ of each set of springs $d^5 d^6 d^7$ is furnished with an adjustable stop $d^{17}$ consisting in a screw mounted on the piston D to limit the movement of this spring towards the piston; and the middle spring $d^6$ of each set of springs is furnished with a similar adjustable stop $d^{18}$; so that the three springs $d^5$ $d^6$ $d^7$ come successively into action at the initial opening movement of the valve, the extreme final closing movement being effected by the inner spring. This gives very great sensitiveness to the movement of the dash-pot under very delicate impulses in either direction such as occur when the scale beam reaches or almost reaches its position of true balance. A separate cap plate $d^{19}$ having an opening $d^{20}$ therein is secured to the piston D over each of the ports or openings $d$ therein, so that by simply changing the cap plates, the size of the effective port or opening through the piston may be changed or adjusted as required. These removable cap plates having ports or openings through the same thus give independent adjustability to each of the effective port openings in the piston.

By providing each of the upwardly and downwardly opening valves in the dash-pot cylinder with a plurality of independently adjustable springs for holding it closed, the movement of the piston in the dash-pot cylinder may be made very sensitive to very slight movements, while at the same time producing a regulating and steadying effect upon the scale beam or other moving device connected thereto, and the dash-pot piston is also caused to offer no undue obstruction to the quick and rapid movement of the scale beam or other moving device under strong or violent impulses until the same nears its balance position or position of true rest.

This is filed as a divisional application of my original application, Serial No. 260,117, filed May 12th, 1905.

I claim:—

1. In a dash pot, the combination with a cylinder, of a piston having a plurality of removable cap plates thereon, each having a valve opening therein, a plurality of upwardly opening valves, a plurality of downwardly opening valves, a plurality of successively acting light springs on the upper side of the piston for each of said upwardly opening valves and a plurality of successively acting light springs on the lower side of the piston for each of said downwardly opening valves, substantially as specified.

2. In a dash-pot, the combination with a cylinder, of a piston, upwardly and downwardly opening valves on the piston and a plurality of successively acting and independently adjustable light springs for each of said valves, substantially as specified.

3. In a dash-pot, the combination with a cylinder, of a piston, upwardly and downwardly opening valves on the piston and a plurality of independently adjustable springs for each of said valves, substantially as specified.

4. In a dash-pot, the combination with a cylinder, of a piston having a plurality of ports or openings through the same, a plurality of upwardly opening valves, a plurality of downwardly opening valves, a plurality of springs for each of said valves, and means for independently adjusting the tension of each of said springs, substantially as specified.

5. In a dash-pot, the combination with a cylinder, of a piston having a plurality of ports or openings through the same, a plurality of upwardly opening valves, a plurality of downwardly opening valves, a plurality of springs for each of said valves, means for independently adjusting the tension of each of said springs, and independent stops for said springs to cause the same to come successively into action, substantially as specified.

6. A dash-pot having a piston provided with a plurality of ports or openings through the same, separate cap plates on said piston having openings therein, a plurality of upwardly and downwardly opening valves for closing said ports and a plurality of springs for each of said valves, substantially as specified.

7. A dash-pot having a piston provided with a plurality of ports or openings through the same, separate cap plates on said piston having openings therein, a plurality of upwardly and downwardly opening valves for closing said ports, a plurality of springs for each of said valves, and adjustable stops for said springs, substantially as specified.

8. A dash-pot having a piston provided with a plurality of ports or openings through the same, separate cap plates on said piston having openings therein, a plurality of upwardly and downwardly opening valves for closing said ports, a plurality of springs for each of said valves, adjustable stops for said springs and means for independently adjusting the tension of each of said springs, substantially as specified.

GEORGE GOETZ.

Witnesses:
PEARL ABRAMS,
H. M. MUNDAY.